(12) United States Patent
Anantharaman et al.

(10) Patent No.: US 6,530,989 B1
(45) Date of Patent: Mar. 11, 2003

(54) METHODS FOR PRODUCTION OF ORGANIC PIGMENTS FOR PRINTING INKS

(75) Inventors: Kalpathy Anantharaman, Cincinnati, OH (US); Michael Lewis, Union, KY (US); Anthony Maliyackel, Loveland, OH (US); Alan Gregory, Williamsburg, OH (US); Sanjoy Ganguly, Fairfield, OH (US); Allen Bauer, Madeira, OH (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 10/034,487

(22) Filed: Dec. 28, 2001

(51) Int. Cl.⁷ .............................................. C09B 67/04
(52) U.S. Cl. ...................... 106/493; 106/412; 106/494; 106/495; 106/496; 106/497; 106/498; 106/499; 106/500

(58) Field of Search ................................. 106/412, 493, 106/494, 495, 496, 497, 498, 499, 500

(56) References Cited

U.S. PATENT DOCUMENTS

| | | | | |
|---|---|---|---|---|
| 4,474,473 A | 10/1984 | Higuchi et al. | ................ | 366/75 |
| 5,366,546 A | 11/1994 | McCrae et al. | .......... | 106/31.73 |
| 5,431,721 A | 7/1995 | Pennaz et al. | ........... | 106/31.35 |
| 5,549,384 A | 8/1996 | Reynolds | .................... | 366/299 |
| 5,549,741 A | 8/1996 | Pennaz et al. | ........... | 106/31.67 |
| 5,964,929 A | 10/1999 | Langley et al. | .......... | 106/31.49 |
| 5,985,019 A | 11/1999 | McCrae et al. | ............. | 106/413 |

*Primary Examiner*—Anthony J. Green
(74) *Attorney, Agent, or Firm*—Sidney Persley

(57) ABSTRACT

A process for the preparation of an organic pigment dispersion is disclosed and consists of dispersing a dried soft-textured organic pigment in a dispersion vehicle, wherein the dispersion vehicle contains an ink varnish and alkyd and the dispersion is carried out in a tank equipped with a sweep and a high speed dispersion blade.

11 Claims, No Drawings

METHODS FOR PRODUCTION OF ORGANIC PIGMENTS FOR PRINTING INKS

FIELD OF THE INVENTION

This invention relates to the production of an organic pigment dispersion by dispersing dried soft-textured organic pigment in a dispersion vehicle.

BACKGROUND OF THE INVENTION

Pigment dispersion for printing ink use are normally made using a Sigma blade mixer wherein the organic pigment in a presscake form is added stepwise along with the flushing vehicle and/or alkyd to break the water from the presscake. The resulting final concentrated paste is then dried under vacuum to low moisture levels and cutback with additional vehicles and/or solvents to a standard product. This process is known in the trade as a flushing process.

Another method commonly employed in the ink industry is to make a premix of the dry pigment in the vehicle of choice with other components like alkyds, wax, etc. and run this over a 3-roll mill to get the dispersion. The final product is then cut back with vehicles and solvents to a standard product.

A third approach is to make the pigment dispersion using an extruder as outlined in U.S. Pat. No. 4,474,473 feeding a pigment presscake and a hydrophobic liquid organic media into a twin screw co-rotating twin screw extruder.

A fourth method as described in U.S. Pat. No. 5,985,019 is to disperse the pigment granules of a mean size of 0.1 to 50 mm in a twin bladed Z blade kneader or a twin screw extruder with a heatset ink varnish.

The flushing process involves the use of a wet presscake containing about 60–70% water, and the need to eliminate all this water by flushing and drying lengthens the overall processing time. The dispersion obtained in the flushing process is good.

The 3-roll milling process can only be done with lower pigment concentration than the flushing process, but also takes long processing times.

The presscake flushing using the extruder as outlined in U.S. Pat. No. 4,474,473 needs a correct feeding rate of presscake and the vehicle to achieve good dispersion. If the rates are not maintained very accurately, the resulting product can be very weak in tinctorial strength.

The pigment concentrate manufactured as outlined in U.S. Pat. No. 5,985,019 also involves a very accurate feeding of the granules and the ink vehicles in the twin screw extruder to get a good dispersion. The twin screw extruder process also involves the formation of lumps if the feed rates are not controlled properly and results in 3-roll milling the final product for ink making. The Z blade kneader method using the granules and the heatset ink varnish restricts the productivity to the size of the kneader which is normally between 500–1000 gallons. About 4000 to 7000 lbs of pigment concentrate can be made using the 500 or 1000 gallon kneaders.

SUMMARY OF THE INVENTION

The present invention provides a process for the preparation of an organic pigment dispersion comprising dispersing a dried soft-textured organic pigment in a dispersion vehicle, wherein said dispersion vehicle comprises an ink varnish and alkyd and said dispersion is carried out in a tank equipped with a sweep and a high speed dispersion blade.

DETAILED DESCRIPTION OF THE INVENTION

It has now surprisingly been found that organic pigment dispersion can be prepared in a tank equipped with a sweep and a high speed dispersion blade by dispersing a dried soft-textured organic pigment in a dispersion vehicle that contains an ink varnish and alkyd. Preferably, the viscosity of said dispersion vehicle is from about 20 to about 60 poises.

Typically, the pigment dispersion contains from about 35% to about 80% pigment by weight. Also typically, the ink varnish contains an ink resin and petroleum distillate which plays a role in decreasing viscosity.

The dried soft-textured organic pigment can be granulated or dry-powdered. The dried pigment granules can contain up to 5% moisture. Examples of pigments include but are not limited to C.I. Pigment Yellow 12, lithol rubine azo, azomethene, copper phthalocyanine, anthraquinone, nitro, perinone, quinacridone, azo or azomethine metal salt or complex, dipyrolopyrole pigment, and mixtures thereof. Preferably, the pigment is C.I. Pigment Yellow or lithol rubine.

The present invention avoids all the shortcomings of the prior art described above. Preferably, the pigment is added to the dispersion vehicle during dispersion in a step-wise fashion. The step wise addition helps in building up the viscosity slowly and promotes better dispersion. The presence of the flushing vehicle along with the alkyd and the necessary oil wets the pigment surface extremely well to obtain a good dispersion. The other major advantage is that the process can be carried out in large tanks where the batch size can reach as high as 25000 lbs or more.

The present invention produces a bulkable and pumpable pigment dispersion which can be directly used without the need of 3-roll milling of the ink, making it easier to handle than the concentrated conventional flush pastes.

EXAMPLE 1

To a 300 gallon mixer fitted with a Sweep blade and a high speed Cowles blade, a rosin modified hydrocarbon varnish (510 lbs) containing resin (60–65%) and Magie 47 oil (35–40%), an alkyd (200 lbs) and Halterman PKWF/7AF oil (150 lbs) were charged. This special composite was mixed for 5 minutes. With the Sweep blade running at 18 rpm (no high speed mixing to avoid dusting), granulated lithol rubine pigment (four adds of 145 lbs for a total of 580 lbs) was charged over 1 hour. After this charge the high speed was run at about 1000 rpm and the Sweep was run at 20 rpm. The pigment and the composite varnish, alkyd, oil was mixed for 1 hour. The temperature of the product was 85° C. The product was mixed for another 1 hour with cooling in the jacket to maintain the temperature below 100° C. The pigment paste was now tested for complete conversion to the bluer shade. Halterman PKWF/7AF oil (7 lbs) and 16 lbs of an antioxidant (16 lbs) were charged to the mixer. The material at this stage was pumpable to recirculate in the mixer. It was recirculated for 1 hour to get complete mixing.

The product was now standardized using 15 lbs of rosin modified hydrocarbon varnish and 37 lbs of Halterman oil used above. The final product was comparable to the standard with a good Nipri grind gauge reading of 0/0 with only 2 scratches. (The Nipri grind gauge reading is an indication of how well the product has dispersed.) The final strength was close to the standard made in a conventional flusher. The final yield on the product was good and the ink made from this process when compared to an ink made from a flusher gave better misting and lithographic emulsion capacity with comparable gloss and wash out residue.

EXAMPLE 2

To a 10 gallon tank fitted with a Sweep and High speed blade an Alkyd (9 lbs), a Rosin modified Hydrocarbon varnish (20 lbs) containing resin (60–65%) and Magie 47 oil (6.8 lbs, petroleum distillate) were charged. To this mix, Clariant yellow DHG-81 dry pigment (34 lbs) was charged under agitation over 60 minutes. This was mixed for 1.5 hrs with a sweep rpm of 125 and a high speed of 1000 rpm.

The cooling water in the jacket of the tank was kept on during the stir period to avoid overheating. The pigment content during the mixing stage was 49% color and 51% of the composite vehicle of alkyd, varnish and oil.

At the end of the stir period, the temperature of the product was 71° C. The product was then cut back with Hexyl carbitol (1.3 lbs), Antioxidant (0.6 lbs)and the Rosin modified Hydrocarbon varnish (10 lbs). The finished dispersion was Somewhat dark, and close in strength to the standard made using a Y-12 presscake with the above materials in a conventional sigma blade mixer. The fineness of grind was also comparable to the std made in the sigma blade mixer (flusher). The washout residue of the tank made batch was 0.0059 gms/100 gms of product and was also good.

The invention has been described in terms of preferred embodiments thereof, but is more broadly applicable as will be understood by those skilled in the art. The scope of the invention is only limited by the following claims.

What is claimed is:

1. A process for the preparation of an organic pigment dispersion comprising the step of dispersing a dried soft-textured organic pigment in a dispersion vehicle, wherein said dispersion vehicle comprises an ink varnish and alkyd and said dispersing step is carried out in a tank equipped with a sweep and a high speed dispersion blade.

2. The process of claim 1, wherein said dried soft-textured organic pigment is granulated or dry-powdered.

3. The process of claim 1, wherein said pigment is selected from the group consisting of: C.I. Pigment Yellow 12, lithol rubine azo, azomethene, copper phthalocyanine, anthraquinone, nitro, perinone, quinacridone, azo or azomethine metal salt-or complex, dipyrolopyrole pigment, and mixtures thereof.

4. The process of claim 3, wherein said pigment is C.I. Pigment Yellow 12.

5. The process of claim 3, wherein said pigment is lithol rubine.

6. The process of claim 1, wherein said ink varnish comprises an ink resin and petroleum distillate.

7. The process of claim 1, wherein said pigment is added to the dispersion vehicle during the dispersing step in a step-wise fashion.

8. The process of claim 1, wherein said pigment dispersion contains from about 35% to about 80% pigment by weight.

9. The process of claim 1, wherein petroleum distillate is added to said dispersion vehicle prior to the dispersing step in order to decrease said dispersion vehicle's viscosity.

10. The process of claim 1, wherein the viscosity of said dispersion vehicle is from about 20 to about 60 poises.

11. The process of claim 1, wherein said dried soft-textured organic pigment is granulated and contains 0–5% moisture.

\* \* \* \* \*

UNITED STATES PATENT AND TRADEMARK OFFICE
CERTIFICATE OF CORRECTION

PATENT NO. : 6,530,989 B1
DATED : March 11, 2003
INVENTOR(S) : Anantharaman et al.

It is certified that error appears in the above-identified patent and that said Letters Patent is hereby corrected as shown below:

Column 2,
Line 18, "lithol rubine azo" should read -- C.I. Pigment Red 57:1 --;
Line 22, "lithol rubine" should read -- C.I. Pigment Red 57:1 --;
Line 47, "lithol rubine pigment" should read -- C.I. Pigment Red 57:1 --.

Column 4,
Line 9, "lithol rubine azo" should read -- C.I. Pigment Red 57:1 --;
Line 16, "lithol rubine" should read -- C.I. Pigment Red 57:1 --.

Signed and Sealed this

Nineteenth Day of August, 2003

JAMES E. ROGAN
*Director of the United States Patent and Trademark Office*